Patented Feb. 10, 1942

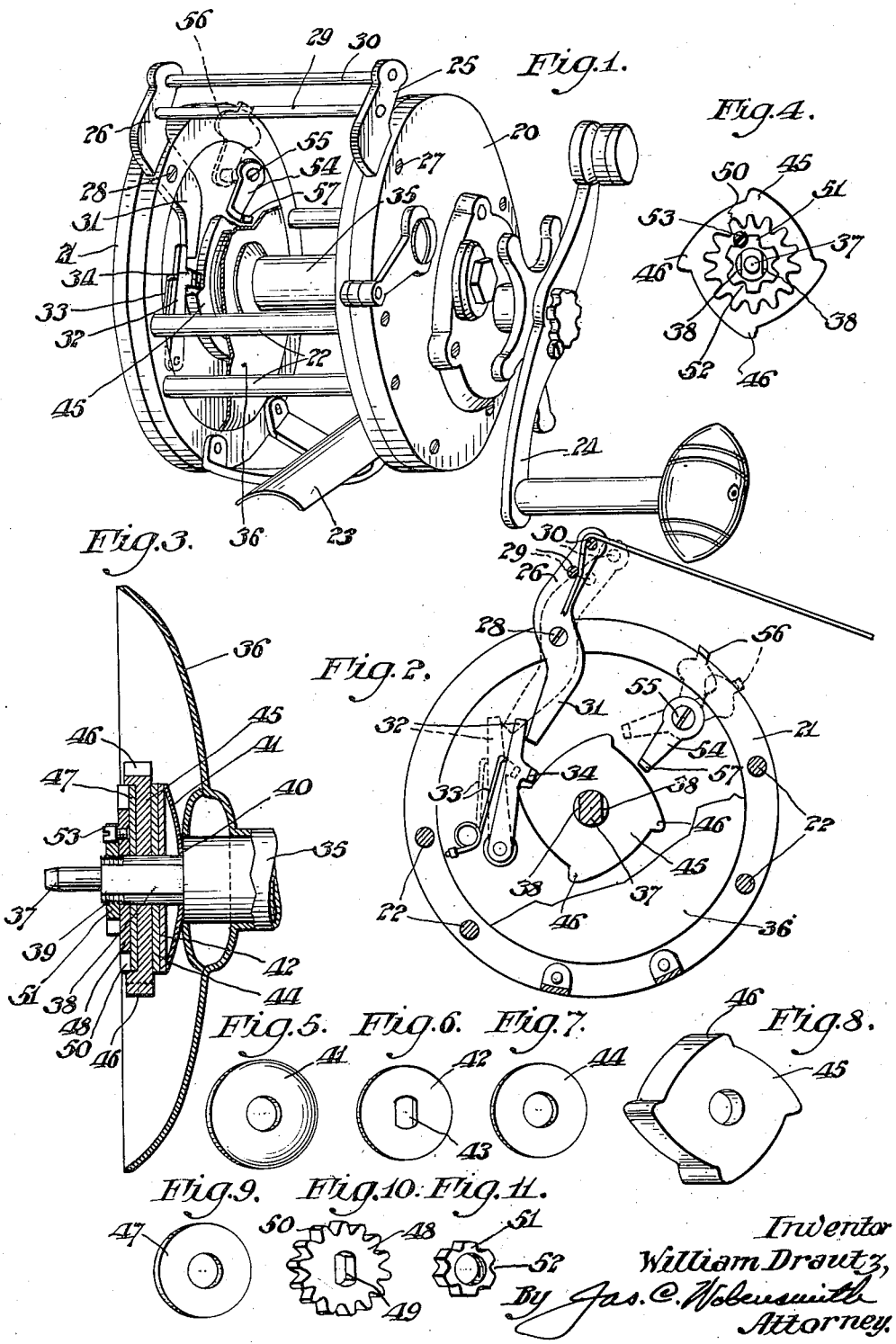

2,272,834

UNITED STATES PATENT OFFICE 2,272,834

FISHING REEL

William Drautz, Philadelphia, Pa.

Application May 13, 1940, Serial No. 334,797

7 Claims. (Cl. 242—84.5)

This invention relates to fishing reels and, more particularly, to the provision in a fishing reel of improved means for automatically preventing unwinding of the line from the spool of the reel, whenever there is no tension on the line.

The invention is more particularly adaptable for reels which are used for casting, being so constructed and arranged as to prevent the so-called back-lash when the cast is completed, thus preventing the line from becoming snarled and entangled through undesired free spinning of the spool.

The invention also contemplates the provision of means for imparting a drag on the line, when desired, so that when the fish takes the bait, a frictional drag may be maintained on the line and spinning of the spool, which sometimes occurs through change of direction of movement of the fish, will be prevented.

The principal object of the present invention is to provide a fishing reel, particularly adapted for casting purposes, having improved means for checking the movement of the spool whenever the tension on the line is relieved.

A further object of the invention is to provide improved means for preventing undesired free spinning of the spool of the reel, either at the end of a cast or when a hooked fish suddenly takes a reverse direction while the line is being played out.

A further object of the invention is to provide improved means for imparting a frictional drag on the spool, of a desired amount, after the fish is hooked.

The nature and characteristic features of the invention will be more readily understood from the following description, taken in connection with the accompanying drawing forming part hereof, in which:

Figure 1 is a perspective view of a fishing reel embodying the main features of the present invention;

Fig. 2 is a transverse section of the reel structure, said section being taken at the end of the spool and illustrating one of the end housings of the reel having parts mounted therein embodying the main features of the present invention;

Fig. 3 is an enlarged sectional view of one end of the spool having certain parts of the present invention mounted on the spindle thereof;

Fig. 4 is a fragmentary elevational view illustrating certain details of the construction and arrangement; and Figs. 5, 6, 7, 8, 9, 10, and 11 are respectively perspective views of certain of the members mounted on the spindle of the spool.

It should, of course, be understood that the description and drawing are illustrative merely, and that various changes and modifications may be made in the structure disclosed without departing from the spirit of the invention.

Referring to the drawing, 20 and 21 are respectively the end housing portions of the frame of the reel, the same being connected by the transverse bars 22 in the usual manner and provided with the usual shoe piece 23 for attaching the reel to the rod. The housing 20 is provided internally with the usual gearing, not shown, to effect the winding of the spool by means of the crank 24. As this mechanism forms no essential part of the present invention, the same will not be further referred to.

In the housings 20 and 21 there are mounted levers 25 and 26 respectively, these levers being pivoted in the rim portions of their respective housings by pivot screws 27 and 28. The levers 25 and 26 are connected by transverse bars 29 and 30 under and over which the line runs from the spool. The bars 29 and 30 are rigidly mounted at their ends in the levers 25 and 26 whereby said levers will be caused to be actuated in unison.

The lever 26 has an inwardly extending portion 31 which engages a lever 32 pivotally mounted in the housing 21. The lever 32 is normally impelled in a direction toward the axis of the spool by means of a spring 33 which is also mounted in the housing 21. The lever 32 is also provided with an extending lug 34 for a purpose to be presently explained.

The spool proper is of ordinary construction having the usual central barrel portion 35, end flanges 36 and spindle 37 by means of which it is rotatably mounted in the housings 20 and 21. However, at the end of the spool which is journalled in the housing 21, the spindle 37 is provided with flat portions 38 and a threaded portion 39. The spindle is reduced in diameter at the portion where the flat sides are provided, thereby providing a shoulder or abutment 40.

A disc spring 41 is mounted on the spindle 37, immediately adjacent the shoulder or abutment 40. Next to the disc spring 41 is a metallic washer 42 having a central aperture 43 for mounting the same on the spindle of the spool. The aperture 43 in the washer 42 is of a shape complemental to the cross section of the spindle 37 at that point, whereby said washer 42 is constrained to rotate in unison with the spindle 37. Next to the washer 42 is another washer 44 mounted on the spindle 37 so as to be rotatable with respect thereto. This washer 44 is made of fiber or other suitable material for imparting the proper amount of friction as will be hereinafter more fully set forth.

Next to the friction washer 44 a toothed ratchet member 45 is mounted on the spindle 37 in such manner as to be rotatable with respect thereto. The ratchet teeth 46 on the periphery of the member 45 are so located that the same will be encountered by the lug 34 of the lever 32 at certain times and in a manner to be hereinafter more fully set forth. The ratchet member 45 is preferably provided with a recess in which another friction disc 47 is mounted, the same being rotatable with respect to the spindle 37 at this point.

On the outside of the friction disc 47 there is mounted a washer 48, the central aperture 49 of which is complemental with the flats 38 provided on the spindle 37 at that point whereby said washer 48 is constrained to rotate in unison with the spindle 37. This washer 48 may, if desired, be provided on its periphery with a plurality of teeth 50 and the same used as part of the click mechanism of the reel, if such mechanism is desired.

On the outside of the washer 48 a nut 51 is threaded on the spindle 37. The nut 51 is provided on its periphery with a plurality of serrations 52 and a screw 53 is threaded in a suitable aperture in the washer 48. The head of the screw 53 is adapted to be seated in one of the serrations 52 of the nut 51 whereby when said screw 53 is in place, the nut 51 will be prevented from changing its position on the threaded portion 39 of the spindle 37.

The purpose of the foregoing arrangement is to provide a regulatable frictional engagement of the ratchet member 45 with respect to the spool. The regulation is obtained by removing the screw 53 and then threading the nut 51 on the threaded portion 39 of the spindle 37 until the proper tension is imparted by means of the disc spring 41 whereupon the screw 53 is replaced with the head thereof seated in the proper serration 52 in the periphery of the nut 51.

There is also provided a pawl 54 pivotally mounted in the housing member 21 by means of the pivot screw 55. This pawl 54 is adapted to be brought to alternative positions as illustrated in full and dotted lines respectively in Fig. 2 of the drawing, by means of a finger piece 56 mounted exteriorly of the housing member 21. The pawl 54 is provided with a lug or projection 57 adapted to be brought into the path of travel of the teeth 46 of the ratchet member 45 in one position to prevent the rotation of said ratchet member 45 at desired times and for a purpose to be presently explained.

The operation of the device may now be explained. The line running from the spool passes under the bar 29 and over the bar 30, which bars are carried by the pivoted levers 25 and 26 and, when the casting takes place, a certain amount of tension will be applied to the line by the travel of the weight at the end thereof. This tension will be imparted to the bar 30 and cause the lever 26 to be tilted and, through the engagement of the projection 31 on the inner end thereof with the lever 32, the lug 34 carried by the lever 32 will be retracted to the position shown in dotted lines in Fig. 2, out of engagement with the teeth 46 of the ratchet member 45.

Assuming that the pawl 54 is in the position shown in dotted lines in Fig. 2 of the drawing, the spool will now be in a free running condition so long as the momentum of the weight on the end of the line continues to maintain the tension of the line. As soon as the weight has reached the end of its travel, that is when the cast is completed, the tension on the line will be relaxed, whereupon the lever 26 will be permitted to return to the position shown in full lines in Fig. 2 of the drawing and the lever 32 under the tension of the spring 33 will be brought to such position that the lug 34 carried by said lever 32 will be caused to engage one of the teeth 46 of the ratchet member 45 and further movement of the spool will be retarded.

By reason of the ratchet member 45 being connected to the spool by the frictional means provided, the shock at the time of the engagement of the lug 34 of the lever 32 with the tooth 46 of the ratchet member 45, will be minimized. It will be noted however, that upon rewinding of the line on the spool, the tension which is imparted by the drag of the line will again cause the lever 26 to be tilted to the dotted line position and the lug 34 of the lever 32 brought out of engagement with the teeth 46 of the ratchet member 45, hence the rewinding of the line on the spool may be done freely without interference from the checking mechanism hereinbefore described.

After the cast has been made, if the user so desires, the pawl 54 may be shifted from the dotted line position to that shown in full lines in Fig. 2 of the drawing, so as to bring the lug 57 of the pawl 54 to such position that the same will be engaged by one of the teeth 46 of the ratchet member 45. After this has been done, when the fish takes the hook and starts off, the ratchet member 45 will, by reason of its frictional engagement with the spool as hereinbefore described, provide a certain frictional drag on the spool which will assist in preventing the fish from freeing itself from the hook. However, when rewinding of the line on the spool takes place, the pawl 54 will be automatically pushed by the tooth 46 to the inoperative position shown in dotted lines in Fig. 2 of the drawing so that there will be no interference with the proper reeling-in of the line.

I claim:

1. In a fishing reel having a frame including end housings, and a spool having its spindle journalled in said end housings, the means for preventing undesired free spinning of the spool which comprises a ratchet rotatably mounted on the spool spindle, a friction disc mounted on each side face of said ratchet, a disc spring mounted on the spindle causing said friction discs to bear against the side faces of said ratchet, a nut threaded on the spool spindle for adjusting the tension of said disc spring, means for securing said nut in adjusted positions, and a movable member having a portion adapted to engage a tooth of said ratchet to arrest the movement thereof.

2. In a fishing reel having a frame including end housings, and a spool having its spindle journalled in said end housings, the means for preventing undesired free spinning of the spool which comprises a ratchet rotatably mounted on the spool spindle, a friction disc mounted on each side face of said ratchet, disc members mounted on the spool spindle and constrained to rotate therewith, said disc members bearing against said friction discs, a disc spring bearing against one of said disc members and causing said friction discs to bear against the side faces of said ratchet, a nut threaded on the spool spindle and bearing against one of said disc members for adjusting the tension of said disc spring, a screw mounted in one of said disc members for securing said nut in adjusted positions, and a movable member having a portion adapted to engage a tooth of said ratchet to arrest the movement thereof.

3. In a fishing reel having a frame including end housings, and a spool having its spindle journalled in said end housings, the means for automatically preventing over-running of the spool when casting which comprises a ratchet rotatably mounted on the spool spindle, a friction disc mounted on each side face of said ratchet, disc members mounted on the spool spindle and constrained to rotate therewith, said disc members bearing against said friction discs, a disc spring bearing against one of said disc members and causing said friction discs to bear against the side faces of said ratchet, a nut threaded on the spool spindle and bearing against one of said disc members for adjusting the tension of said disc spring, a screw mounted on one of said disc members for securing said nut in adjusted positions, a lever pivotally mounted in one of the end housings of the frame having a portion adapted to engage a tooth of said ratchet, a spring impelling said lever to engaging position, and means controlled by the tension of the line for disengaging said lever from said ratchet.

4. In a fishing reel having a frame including end housings, and a spool having its spindle journalled in said end housings, the means for automatically preventing over-running of the spool when casting which comprises a ratchet rotatably mounted on the spool spindle, a friction disc mounted on each side face of said ratchet, disc members mounted on the spool spindle and constrained to rotate therewith, said disc members bearing against said friction discs, a disc spring bearing against one of said disc members and causing said friction discs to bear against the side faces of said ratchet, a nut threaded on the spool spindle and bearing against one of said disc members for adjusting the tension of said disc spring, a screw mounted on one of said disc members for securing said nut in adjusted positions, a lever pivotally mounted in one of the end housings of the frame having a portion adapted to engage a tooth of said ratchet, a spring impelling said lever to engaging position, and means controlled by the tension of the line for disengaging said lever from said ratchet including a pair of levers pivoted in the end housings of the reel, and bars over which the line runs connecting said levers.

5. In a fishing reel having a frame including end housings, and a spool having its spindle journalled in said end housings, the means for automatically preventing overrunning of the spool when casting which comprises a ratchet rotatably mounted on the spool spindle, a friction disc mounted on each side face of said ratchet, disc members mounted on the spool spindle and constrained to rotate therewith, said disc members bearing against said friction discs, a disc spring bearing against one of said disc members and causing said friction discs to bear against the side faces of said ratchet, a nut threaded on the spool spindle and bearing against one of said disc members for adjusting the tension of said disc spring, a screw mounted on one of said disc members for securing said nut in adjusted positions, a lever pivotally mounted in one of the end housings of the frame having a portion adapted to engage a tooth of said ratchet, a spring impelling said lever to engaging position, and means controlled by the tension of the line for disengaging said lever from said ratchet comprising a pair of levers pivoted in the end housings of the reel, bars over which the line runs connecting said levers, and one of said levers having an extension coacting with the ratchet engaging lever.

6. In a fishing reel having a frame including end housings, and a spool having its spindle journalled in said end housings, the means for automatically preventing overrunning of the spool when casting which comprises a ratchet rotatably mounted on the spool spindle, a friction disc mounted on each side face of said ratchet, disc members mounted on the spool spindle and constrained to rotate therewith, said disc members bearing against said friction discs, a disc spring bearing against one of said disc members and causing said friction discs to bear against the side faces of said ratchet, a nut threaded on the spool spindle and bearing against one of said disc members for adjusting the tension of said disc spring, a screw mounted on one of said disc members for securing said nut in adjusted positions, a lever pivotally mounted in one of the end housings of the frame having a portion adapted to engage a tooth of said ratchet, a spring impelling said lever to engaging position, and means controlled by the tension of the line for disengaging said lever from said ratchet comprising a pair of levers pivoted in the end housings of the frame, bars over which the line runs connecting said levers, and one of said levers having an extension coacting with the ratchet engaging lever; and manually actuatable means independent of the line controlled means for arresting the movement of the ratchet.

7. In a fishing reel having a frame including end housings, and a spool having its spindle journalled in said end housings, the means for automatically preventing overrunning of the spool when casting which comprises a ratchet rotatably mounted on the spool spindle, a friction disc mounted on each side face of said ratchet, disc members mounted on the spool spindle and constrained to rotate therewith, said disc members bearing against said friction discs, a disc spring bearing against one of said disc members and causing said friction discs to bear against the side faces of said ratchet, a nut threaded on the spool spindle and bearing against one of said disc members for adjusting the tension of said disc spring, a screw mounted on one of said disc members for securing said nut in adjusted positions, a lever pivotally mounted in one of the end housings of the frame having a portion adapted to engage a tooth of said ratchet, a spring impelling said lever to engaging position, and means controlled by the tension of the line for disengaging said lever from said ratchet comprising a pair of levers pivoted in the end housings of the frame, bars over which the line runs connecting said levers, and one of said levers having an extension coacting with the ratchet engaging lever; and manually actuatable means independent of the line controlled means for arresting the movement of the ratchet, said means comprising a pawl having a portion adapted to engage a tooth of the ratchet, and an external finger lever connected to said pawl.

WILLIAM DRAUTZ.